Aug. 17, 1954  R. G. LE TOURNEAU  2,686,535
SOLENOID VALVE
Filed Jan. 23, 1950
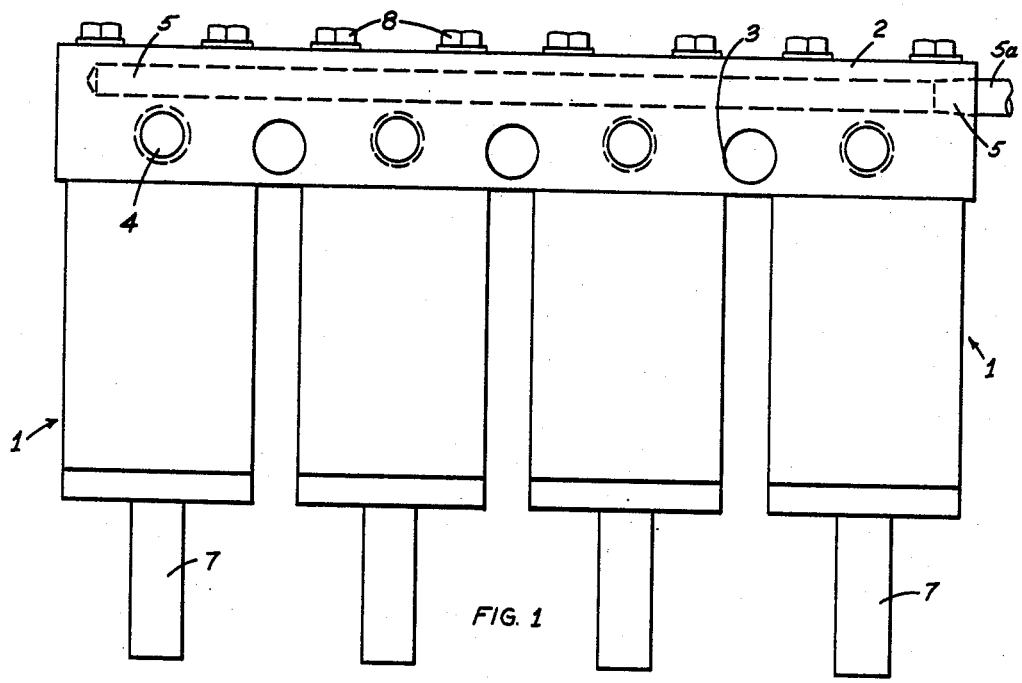
FIG. 1
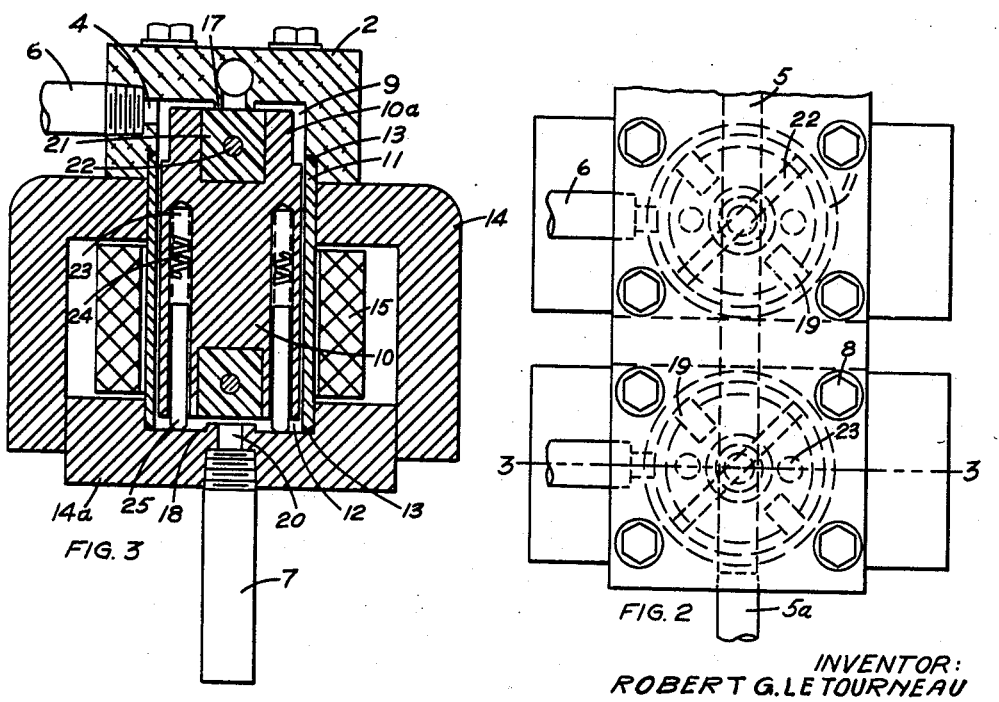
FIG. 3
FIG. 2
INVENTOR:
ROBERT G. LE TOURNEAU
BY
ATTORNEYS Patented Aug. 17, 1954

2,686,535

UNITED STATES PATENT OFFICE 2,686,535

SOLENOID VALVE

Robert G. Le Tourneau, Longview, Tex., assignor to R. G. Le Tourneau, Inc., Peoria, Ill., a corporation of California Application January 23, 1950, Serial No. 140,092

3 Claims. (Cl. 137—620)

This invention relates generally to electro-magnetically operated valve assemblies of the solenoid type and more particularly to a valve of this type used to control fluid pressure actuated mechanisms.

The primary object of this invention is to provide a solenoid valve unit which may be used for "normally on" or "normally off" operation.

Another object is to provide a solenoid valve unit in which the plunger guide sleeve also acts as a chamber to direct the air passage.

A further object is to provide a solenoid valve unit in which the magnetic material plunger includes passageways to permit the air to bypass so that both the plunger and air may occupy and operate in the same chamber.

A still further object is to provide a valve unit which includes a resilient material removable valve insert enclosed by the plunger which cooperates with a metal valve seat on a stationary part of the valve. This prevents there being any contact between the magnetic material plunger and magnetic material body which would be undesirable in a solenoid actuated valve; it also provides a spring action for quick release.

Other objects and advantages will become apparent from a perusal of the following specification and the accompanying drawing in which:

Fig. 1 is a side elevational view of the assembly of a bank of valve units employing this invention.

Fig. 2 is a fragmentary top plan of the structure shown in Fig. 1.

Fig. 3 is a sectional elevation taken along the line 3—3 of Fig. 2.

Referring now to the drawing, the valve assembly in Fig. 1 is seen to consist of four valve units indicated generally at 1, and a common aluminum manifold head 2 including mounting holes 3 and several functional ports 4 and a threaded (exhaust) manifold port 5. Port 5 is open directly to the atmosphere when used as the exhaust port and receives a threaded intake pipe 5a when it is used in another embodiment as an intake port. The functional ports 4 are threaded to receive pipe or tube 6 to carry fluid under pressure passing thru the valve from the intake pipe 7 to an operational device, in this case an air pressure actuated clutch or brake (not shown). Intake pipe leads into the valve unit from an intake manifold (not shown) located generally below the assembly. Bolts 8 are employed to attach the manifold head 2 to the separate valve units 1.

In Fig. 3 it will be seen that the manifold 2 includes a cavity 9 which surrounds the upper portion 10a of plunger 10 and sleeve 11. Manifold cavity 9 together with the volume enclosed by sleeve 11 form a combined fluid directing and plunger operating chamber 12.

The valve unit apart from the manifold 2 includes a magnetic material bracket-shaped body 14 which supports a sleeve 11 which is of non-magnetic material such as brass. At each end of this sleeve 11 is placed sealing means which may be rings 13 of resilient, oil resistant material such as neoprene. One such ring 13 forms a seal between the sleeve 11 and the plate 14a and the other ring 13 forms a seal between the sleeve and the head 2, the sealing means thus preventing escape of fluid from the chamber 12. Body 14 includes an integral bottom plate 14a also of magnetic material. A solenoid winding 15 is contained within and protected by body 14 and itself surrounds the thin walled sleeve 11. Plunger 10 of magnetic material is slidably located within the sleeve chamber 12 and adapted to move between valve seat 17 of the manifold and valve seat 18 of the body.

The plunger 10 includes vertical slots 19 to permit air to pass from intake port 20 to functional port 4 without being obstructed by the close fit of the plunger within sleeve 11.

At each end of plunger 10 there is a valve insert 21 which is cylindrical in shape and is held in place by pin 22 so that it is readily replaceable. These inserts may even be reversed within their own sockets to obtain the maximum wear therefrom since pin 22 is located centrally of each end. Vertical holes 23 have been drilled in plunger 10 from the lower end to receive springs 24 and brass push pins 25. This arrangement causes the plunger to be forced upward and against valve seat 17 when winding 15 is not energized. This position permits the air supply to be continuous to the functional units thru port 4. The upper portion 10a is smaller in diameter than the main portion of plunger 10 to facilitate passage of air therearound when being directed to port 4 or when passing between port 4 and port 5.

When this valve assembly is used in a steering system of the type shown in co-pending application No. 764,185, filed July 28, 1947, now Patent No. 2,615,542, two of the valve units would be connected thru their ports 4 to steering clutches and two of the units would be connected to brake groups which control both wheels on one side of the vehicle. When steering is desired, the valve unit connecting the steering clutch on one side of the vehicle is actuated, that is, winding 15 is energized and plunger 10 moves down and seats against valve seat 18. At the same time the valve unit connecting the brake group on the opposite side is energized and any braking will then affect only the side which assists the steering action. When air is thus shut off from one air operated steering clutch the vehicle will steer toward that side, and when the air supply to the air actuated brake group on the opposite side is shut off this steering action will be accelerated by application of the brakes. This coordination of valve operation is accomplished by the circuit winding which causes the solenoid windings of selected valve units to be energized simultaneously.

Since manifold head 2 and sleeve 11 are of non-magnetic material, the flux created upon energization of winding 15 will be contained in two virtually closed circuits, i. e., vertically thru plunger 10 and out and around both sides of bracket-shaped body 14. This construction of forming a closed path will of course reduce dispersion of the flux which will result in a stronger pull on the plunger, and at the same time the open sides of body 14 will facilitate cooling which is desirable when the valve is subject to successive opening and closing. The combination of the raised valve seat 18 and the resilient material (neoprene) valve insert 21 is advantageous in preventing any drag upon de-energization of winding 15. The raised valve seat holds the iron plunger 10 and iron bottom plate 14a apart and the use of neoprene in the insert eliminates any magnetic material contact, so that no residual magnetic drag remains between the operating parts.

The embodiment shown and described thus far is for "normally on" operations. If it is desired to use this valve for "normally off" operations, such as for controlling various stages of an air operated transmission such as that shown in co-pending application No. 735,484, filed March 18, 1947, now Patent No. 2,553,376 then the former exhaust port 5 is fitted with an intake pipe 5a so that it will now function as an air supply manifold. The former intake port 20 may be disconnected from pipe 7 so that it is now open to the atmosphere and acts as the exhaust port. In this modified embodiment, the springs and pins 25 hold the plunger 10 against valve seat 17 until such time as it is desired to supply air under pressure to functional port 4, in which case winding 15 is energized and plunger 10 is pulled off seat 17 and onto seat 18 to close the exhaust port 20.

From the foregoing description, it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention, the following is claimed as new and useful, and upon which Letters Patent is desired:

1. In an electromagnetically operated valve assembly for controlling fluid flow, a housing of magnetic material, the lower part of the housing being closed, a non-magnetic head attached to said housing to close the upper open part of said housing, a non-magnetic cylindrical sleeve disposed within said housing and said head and forming a hermetically sealed chamber within said housing, an electromagnetic coil mounted around said sleeve, a magnetic slug freely suspended within said enclosure, said slug being spring-biased toward said head, a load port for supplying fluid from said chamber, a first port in said head and a second port in said housing each connecting with the chamber, said plunger having resilient valve inserts in each end thereof cooperating with the first and second ports so that when said coil is energized said second port is closed and said first port is opened connecting the load port and said first port, and when said coil is de-energized said first port is closed and said second port is opened connecting the load port and said second port, said slug having a plurality of internal bores extending into one end thereof and having coil springs disposed within said bores to bias said slug towards said first port.

2. In an electromagnetically operated valve assembly for controlling fluid flow, a housing of magnetic material, the lower part of the housing being closed, a non-magnetic head attached to said housing to close the upper open part of said housing, a non-magnetic cylindrical sleeve disposed within said housing and said head and forming a hermetically sealed chamber within said housing, an electro-magnetic coil mounted around said sleeve, a magnetic slug freely suspended within said enclosure, said slug being spring-biased toward said head, a load port for supplying fluid from said chamber, a first port in said head and a second port in said housing each connecting with the chamber, said plunger having resilient valve inserts in each end thereof cooperating with the first and second ports so that when said coil is energized said second port is closed and said first port is opened connecting the load port and said first port, and when said coil is de-energized said first port is closed and said second port is opened connecting the load port and said second port, said slug having means disposed around the periphery of said slug to provide a path for said fluid between the slug and the sleeve.

3. In an electromagnetically operated valve assembly for controlling fluid flow, a housing of magnetic material, the lower part of the housing being closed, a non-magnetic head attached to said housing to close the upper open part of said housing, a non-magnetic cylindrical sleeve disposed within said housing and said head and forming a hermetically sealed chamber within said housing, an electromagnetic coil mounted around said sleeve, a magnetic slug freely suspended within said enclosure, said slug being spring-biased toward said head, a load port for supplying fluid from said chamber, a first port in said head and a second port in said housing each connecting with the chamber, said plunger having resilient valve inserts in each end thereof cooperating with the first and second ports so that when said coil is energized said second port is closed and said first port is opened connecting the load port and said first port, and when said coil is de-energized said first port is closed and said second port is opened connecting the load port and said second port, said slug having a plurality of internal bores extending into one end thereof and having coil springs disposed within said bores to bias said slug towards said first port, said slug having means disposed around the periphery of said slug to provide a path for said fluid flow between the slug and the sleeve.

(References on following page)

References Cited in the file of this patent

UNITED STATES PATENTS

| Number | Name | Date |
|---|---|---|
| 1,651,865 | Blake | Dec. 6, 1927 |
| 1,674,914 | Murray | June 26, 1928 |
| 2,095,560 | Vickers | Oct. 12, 1937 |
| 2,267,515 | Wilcox | Dec. 23, 1941 |
| 2,288,912 | Mears | July 7, 1942 |
| 2,289,456 | Ray | July 14, 1942 |
| 2,425,380 | Livers | Aug. 12, 1947 |
| 2,479,398 | Parsons | Aug. 16, 1949 |
| 2,546,325 | Wasserlein | Mar. 27, 1951 |
| 2,547,390 | Harris | Apr. 3, 1951 |
| 2,569,751 | Dube | Oct. 2, 1951 |

FOREIGN PATENTS

| Number | Country | Date |
|---|---|---|
| 208,703 | Great Britain | July 10, 1924 |